United States Patent
Choudhary et al.

(10) Patent No.: US 6,894,183 B2
(45) Date of Patent: May 17, 2005

(54) METHOD FOR GAS—SOLID CONTACTING IN A BUBBLING FLUIDIZED BED REACTOR

(75) Inventors: Vasant Ramachandra Choudhary, Pune (IN); Tushar Vasant Choudhary, Pune (IN)

(73) Assignee: Council of Scientific and Industrial Research, New Delhi (IN)

( * ) Notice: Subject to any disclaimer, the term of this patent is extended or adjusted under 35 U.S.C. 154(b) by 383 days.

(21) Appl. No.: 09/817,744

(22) Filed: Mar. 26, 2001

(65) Prior Publication Data

US 2002/0179489 A1 Dec. 5, 2002

(51) Int. Cl.$^7$ ..................... C07C 253/24; C07C 253/26
(52) U.S. Cl. ...................................... 558/320; 558/319
(58) Field of Search ......................................... 558/320

(56) References Cited

U.S. PATENT DOCUMENTS 5,965,765 A * 10/1999 Kurihara et al.

* cited by examiner

Primary Examiner—Joseph K. McKane
Assistant Examiner—Rebecca Anderson

(74) Attorney, Agent, or Firm—Ladas & Parry LLP

(57) ABSTRACT

The present invention relates to a method for gas-solid contacting in a bubbling fluidized bed reactor by:

Figure 1:
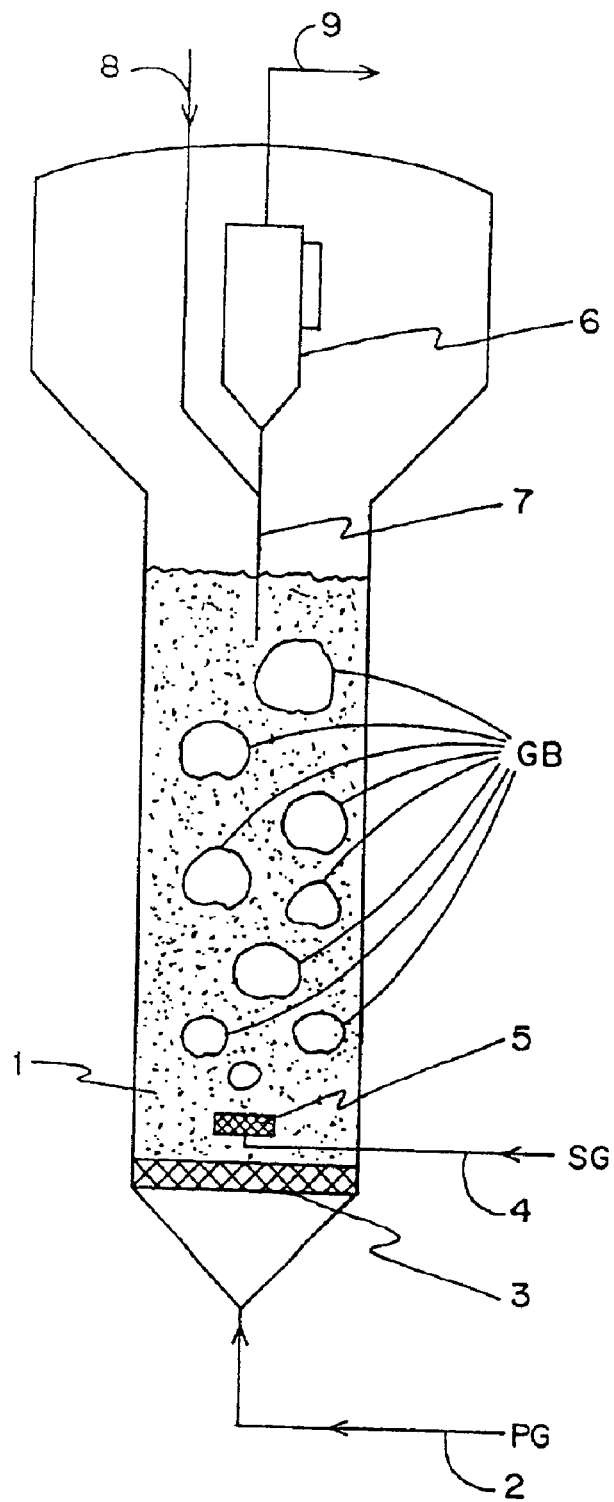

(a) introducing into a reactor with bed length to bed diameter ratio below about 5.0, a primary gas consisting essentially of reactant(s) of the reaction to be carried out in the bed of solid particles through a primary gas distributor located at the reactor bottom at a superficial gas velocity $U_p$, which is very close or equivalent to the minimum fluidization velocity $U_{mf}$, required for achieving the incipient fluidization of the solid particles in the bed to obtain an emulsion phase consisting essentially of the solid particles and the primary gas with little or no formation of gas bubbles to achieve incipient fluidization or liquid-like behavior of fluidizable solid particles;

(b) forming gas bubbles in the incipiently fluidized bed by introducing through a secondary gas distributor located immediately above the primary gas distributor a secondary gas, selected from one of the reactants which is used in excess of that required for the reaction stoichiometry, steam, an inert or a mixture of two or more thereof at a superficial gas velocity, $U_s$, which is related to the superficial velocity of the primary gas such that a ratio of the superficial velocity of the secondary gas to the superficial velocity of the primary gas $U_s/U_p$, is in the range from about 0.5 to about 10.0, preferably from about 1 to about 5.

12 Claims, 1 Drawing Sheet

METHOD FOR GAS— SOLID CONTACTING IN A BUBBLING FLUIDIZED BED REACTOR

FIELD OF THE INVENTION

This invention relates to a method for gas-solid contacting in a bubbling fluidized bed reactor. This invention particularly relates to a method for the improvement of gas-solid contacting in a bubbling fluidized bed reactor, useful for highly exothermic or highly endothermic or temperature sensitive catalytic or non-catalytic reactions, by avoiding the bypass of reaching gas(es) through gas bubbles.

The method of invention can be used in the chemical, petrochemical and petroleum industries for carrying out highly exothermic, highly endothermic or temperature sensitive catalytic or non-catalytic reactions in a bubbling fluidized bed reactor.

BACKGROUND OF THE INVENTION

Fluidization of solid particles by gas is a well-known phenomenon. When a gas is passed upwards to a bed of fine solid particles, the state of the bed depends upon the gas flow rate as follows: At low flow rate gas merely percolates through the voids between the stationary particles and the bed is called fixed bed. However, with an increase in the gas flow rate, particles move apart forming expanded bed. With a further increase in the gas flow rate, a point is reached when all the particles are just suspended in the upward flowing gas and such a bed is referred to as an incipiently fluidized bed or a bed at minimum fluidization. When gas flow rate is increased beyond minimum fluidization, large instabilities in bubbling and channeling of gas are observed. At this stage, the movement of particles becomes more vigorous but the bed does not expand much beyond its volume at minimum fluidization. Such a bed is referred to as bubbling fluidized bed and it consists of two distinct phases: a non-continuous bubble phase consisting mainly of gas with a very low concentration of solid particles carried over by the gas bubbles, and a continuous emulsion phase consisting of solid particles and gas (Ref. J. F. Davidson and D. Harrison in Fluidized Particles, Cambridge University Press, 1963; D. Kunii and O. Lavenspiel in Fluidization Engineering, John Wiley and Sons. Inc., New York, 1969).

Most commercial gas fluidized bed reactors for catalytic and non-catalytic reaction operate in the bubbling regime as bubbling fluidized beds. In the bubbling fluidized bed reactor, the upward motion of the gas bubbles cause enough mixing of solid particles in the emulsion phase, also called as the dense phase and hence the temperature is nearly uniform in the entire reactor. This effect of gas bubble is favourable. However, because of the low concentration of solid particles in the gas bubbles, there is little reaction within the bubbles. Moreover, the bubbles serve as channels for gases to bypass the solid particles and leave the reactor more or less unreacted for the catalytic reaction, when the solid particles are catalyst particles, and also for the non-catalytic reactions, when the solid particles are in particles in case of thermal non-catalytic reactions e.g. thermal cracking of naphtha or with sand or solid reactant in case of non-catalytic gas-solid reactions, e.g. reduction of metal oxides by H2 and/or CO, regeneration of coked catalyst by oxidative treatment.

A number of commercial catalytic and non-catalytic reactions are carried out in bubbling fluidized bed reactors. Art method for the operation of bubbling fluidized bed reactor for gas phase catalytic or non-catalytic reaction involve a fluidization of solid particles in the reactor by reacting gas(es) at a superficial velocity which is much higher than that requird for anticipant fluidization or minimum fluidization of the solid particles, the reacting gas in excess for incipient or minimum fluidization passes through the reactor in the form of gas bubbles. The advantages of bubbling fluidized bed reactors are liquid like flow of solid particles, rapid mixing of solid particles leading nearly isothermal conditions throughout reactor, possibility or circulating solids between two fluidized beds so that catalysts particles coked due to catalytic reaction in one reactor can be transported to second reactor or their regeneration by oxidative treatment, high rates of heat transfer between a fluidized bed and a heat exchanger immersed within fluidized bed. All these advantages make the operation of bubbling fluidized bed reactor simple, easy and reliable from process control point of view. However, disadvantages or limitations of bubbling fluidized bed reactors used earlier are also many. The main limitation of using bubbling fluidized bed reactor for a catalytic or non-catalytic reaction is the difficulty in describing the flow of reacting gas through the emulsion phase and bubble phase, with its large deviation from plug flow and bypassing of the solid particles by reacting gas through gas bubbles, resulting in an inefficient contacting between solid particles and reacting gas. This becomes particularly very serious when high conversion of reacting gas is required. Commercial scale operations involve high gas throughputs, requiring large bed diameters and gas velocities. Both these factors lead to vigorously bubbling beds with large size bubbles with their serious bypassing and poor gas-solid contacting. Under such condition a high conversion can be attained by keeping contact time long by increasing reactor height for a given operating gas velocity at a cost of increased capital, increased catalytic cost increasing power requirement for pumping the gas streams. However, high selectivity cannot be achieved by this as it can be achieved only under high gas-solid contact efficiency. Also because of the non-ideal flow of the gas in the bubbling fluidized bed reactors and complex nature of the exchange of gas between emulsion phase and bubble phase, it is difficult to predict the reactor performance and also to design or scale-up the reactor (Ref D. Kunii and O. Levenspiel in Fluidization Engineering, John Wiley & Sons, Inc. 1969; O. Levenspiel in Chemical Reaction Engineering, $2^{nd}$ Edn. Wiley Eastern Ltd., Y. Ikeda in Fluidization on 85: Science and Technology, Ed. Kunii et al, Conference papers, $2^{nd}$ China-Japan Symposium, Kunming China, Science Press, Beizing China, Elsevier, Arnst 1985 p. 1) and W. Yongan et al, Ibid. p. 11).

It is preferable in commercial practice to avoid the bypassing of the reacting gas which is in excess of what required for incipient or minimum fluidization, so that a major limitation or drawback of bubbling fluidized bed reactors could be eliminated. The following are used in the prior art to overcome the problem of bypassing of reacting gas through gas bubbles:

(a) Internals are inserted into the bed to hinder gas bubble growth and also to cut down size of bubbles. This reduces bypassing of reacting gas through gas bubbles but only to a small extent.

(b) A combination of bubbling fluidized bed and packed bed reactor, where the gas first passes through the fluidized bed section and then through the packed bed section, is used for achieving high conversion of reacting gases. This reactor system is however, complex and difficult to operate and control and yet there is a bypass of reacting gas through bubbles of the bubbling bed reactor.

(c) A use of fast fluidization with less fluidized solid particles is also suggested. As compared to bubbling fluidized bed, the fast or lean fluidized bed has some advantages, such as the gas-solid contact efficiency is higher and the gas flow is plug or piston flow. However, it has also a serious drawback such as the solid particles in the reactor becomes very dilute and the advantages of bubbling fluidized bed in commercial operation are lost (References: O. Levenspiel in Chemical Reaction Engineering, $2^{nd}$ edition, Wiley Eastern Ltd., and Y. Ikeda in Fluidization 1985: Science and Technology, Ed. Kunii et. al., Conference papers, $2^{nd}$ China-Japan Symposium Kunming, China, Science Press, Beijing, China, Elsevier, Amst., 1985).

If the bypass of reacting gas(es) through gas bubbles in bubbling fluidized bed reactor is eliminated or drastically reduced, and thereby gas-solid contacting efficiency is increased, this would be of great practical importance for carrying out a number of highly exothermic, highly endothermic catalytic or temperature sensitive non-catalytic reactions, using bubbling fluidized bed reactors. Hence, thee is a need for developing an improved method for the operation of bubbling fluidized bed reactor to achieve this goal.

OBJECTS OF THE INVENTION

This invention is made with the following objects so that most of the drawbacks or limitations of the prior art method for the operation of bubbling fluidized bed reactor for catalytic or non-catalytic reactions could be overcome.

The main object of the present invention is to eliminate or drastically reduce a bypass of reacting gas through gas bubbles without its contacting with solid particles and thereby to achieve an efficient contacting between solid particles and reacting gas in a bubbling fluidized bed reactor so that a high conversion of reacting gas(es).

It is another object of the present invention to obtain a high selectivity for gas phase catalytic or non-catalytic reactions in bubbling fluidized bed reactors.

Another object of this invention is to simplify and also make easier the design and/or scale-up of a bubbling fluidized bed reactor for catalytic or non-catalytic reactions.

SUMMARY OF THE INVENTION

These and other objects are accomplished in this invention by providing a novel method for the improvement of gas-solid contacting in a bubbling fluidized bed reactor, useful for gas phase catalytic or non catalytic or non-catalytic reaction.

Accordingly the present invention relates to a method for gas-solid contacting in a bubbling fluidized bed reactor said method comprising:

(a) introducing into a reactor with bed length to bed diameter ratio below about 5.0, a primary gas consisting essentially of reactant(s) of the reaction to be carried out in the bed of solid particles through a primary gas distributor located at the reactor bottom at a superficial gas velocity $U_p$, which is very close or equivalent to the minimum fluidization velocity $U_{mf}$, required for achieving the incipient fluidization of the solid particles in the bed to obtain an emulsion phase consisting essentially of the solid particles and the primary gas with little or no formation of gas bubbles to achieve incipient fluidization or liquid-like behaviour of fluidizable solid particles;

(b) forming gas bubbles in the incipiently fluidized bed by introducing through a secondary gas distributor located immediately above the primary gas distributor a secondary gas, selected from one of the reactants which is used in excess of that required for the reaction stoichiometry, steam, an inert or a mixture of two or more thereof at a superficial gas velocity, $U_s$, which is related to the superficial velocity of the primary gas such that a ratio of the superficial velocity of the secondary gas to the superficial velocity of the primary gas $U_s/U_p$, is in the range from about 0.5 to about 10.0, preferably from about 1 to about 5.

In one embodiment of the invention, the direct bypassing of the reacting gas through gas bubbles is avoided using a reacting gas only for obtaining an incipient fluidization without forming gas bubbles, while retaining the advantages of bubbling fluidized bed reactor.

In another embodiment of the invention, the reactor comprises a single bubbling fluidized bed reactor or individual bubbling fluidized bed reactors of a multiple reactor system consisting of two or more bubbling fluidized bed reactors with continuous transportation or re-circulation of solid particles between the reactors.

In another embodiment of the invention, the size of the solid particles in the reactor is below 150 um.

In a further embodiment of the invention, the reaction comprises a catalytic reaction, a non-catalytic thermal reaction or a non-catalytic gas-solid reaction.

In a further embodiment of the invention, the solid particles in the reactor consist essentially of a catalyst useful for catalysing the reaction.

In yet another embodiment of the invention, the catalytic reactions which can be carried out using said method comprise ammoxidation of propylene or propane to acrylonitrile, oxidation of propylene or propane to acrolein and/or acrylic acid, oxidation of naphthalene or o-xylene to phthalic anhydride, oxidation of benzene or butane to maleic anhydride, Fischer Tropsch synthesis of hydrocarbons and or oxygenates from carbon monoxide and hydrogen, gas phase chlorination or oxychlorination of hydrocarbons, gas phase hydrogenation of organic compounds, fluid catalyst cracking of oil, fluid catalytic reforming of naphtha and other hydrocarbons, reforming of hydrocarbons to synthesis gas, hydrocracking of heavy oil.

In another embodiment of the invention, when said method is used for carrying out a non-catalytic reaction in a bubbling fluidizing bed reactor, the solid particles in the reactor consist of inert solid, such as sand, sintered silica, sintered alumina, sintered silica-alumina, sintered zirconia-haffnia or other sintered and/or refractory material which is chemically inert to the reactants of the thermal reactions.

In a further embodiment of the invention, the non-catalytic thermal reactions which are carried out using said method are fluid thermal cracking processes.

In yet another embodiment of the invention, the fluid thermal cracking process comprises thermal cracking of naphtha and heavy oil.

In yet another embodiment of the invention, when said method is used for carrying out a non-catalytic gas-solid reaction in a fluidized bed reactor, the solid particles in the reactor consist essentially of solid reactant, such as reducible metal oxides, partially reduced metal oxides, deactivated catalyst due to coking of other solid reactants of known gas-solid reactions, which is converted into product of the reaction.

In a further embodiment of the invention, the non-catalytic gas-solid reactions are selected from reduction of metal oxides from ores in metallurgical industries, gasification, of coal combustion of coal or regeneration of coked catalyst by gasification of carbon or coke present in the catalyst.

In a further embodiment of the invention, the size of the fluidizable solid particles used in the fluidized bed reactor are in the range of from 30 μm to 150 μm.

In another embodiment of the invention, the primary gas comprises of one or more reactants of the reaction to be carried out in the reactor.

In a further embodiment of the invention, the ratio of superficial velocity of secondary gas $U_s$, to superficial velocity of primary gas $U_p$, is between 1 and 5.

In another embodiment of the invention, the primary and secondary gases are introduced in the reactor separately, using separate gas distributors.

BRIEF DESCRIPTION OF THE ACCOMPANYING DRAWING

FIG. 1 is a schematic of a bubbling fluidized bed reactor showing the emulsion phase, bubble phase or gas bubbles in emulsion phase, gas line and distributor for the primary gas, and also gas line and distributor for the secondary gas.

DETAILED DESCRIPTION OF THE INVENTION

The improvement in the method of the invention for the gas-solid contacting in a bubbling fluidized bed reactor, useful for gas phase catalytic or non-catalytic reaction comprises:

(a) achieving an incipient fluidization or liquid-like behaviour of fluidizable solid particles, which are either catalyst particles or inert solid particles or particles of solid reactant or mixture of two or more thereof, contained in a reactor with bed length to bed diameter ratio below about 5.0, by introducing a primary gas consisting essentially of reactant(s) of the reaction to be carried out, in the bed of solid particles through a primary gas distributor located at the reactor bottom at a superficial gas velocity $U_p$, which is very close or equivalent to a minimum fluidization velocity, $U_{mf}$, required for achieving the incipient fluidization of the solid particles in the bed, such that an emulsion phase consisting essentially of the solid particles and the primary gas with little or non formation of gas bubbles;

(b) forming gas bubbles in the incipiently fluidized bed by introducing through a secondary gas distributor located immediately above the primary gas distributor a secondary gas, selected from one of the reactants which is used in excess of that required for the reaction stoichiometry, steam, an inert gas or a mixture of two or more thereof a superficial gas velocity $U_s$, which is related to the superficial velocity of the primary gas such that a ratio of the superficial velocity of the secondary gas to the superficial velocity of the primary gas $U_s/U_p$, is in the range from about 0.5 to about 10.0.

Referring now to FIG. 1 for the method of this invention, the primary gas PG enters the bed of solid particles through primary gas line 2 and primary gas distributor 3, located at the bottom of the bed, at a superficial velocity $U_p$ equal to or close to be minimum fluidization velocity $U_{mf}$ required for fluidizing the solid particles, forming an emulsion phase 1 consisting of the primary gas and the solid particles, and then the secondary gas SG enters the emulsion phase at a superficial velocity $U_s$ which is equal to or higher than the minimum fluidization velocity $U_{mf}$, through a secondary gas line 4 and secondary gas distributor 5, which is located above the primary gas distributor 3, preferably immediately above the primary gas distributor, forming gas bubbles GB or bubble phase in the fluidized solid particles. Cyclone 6 traps the solid particles that have escaped the fluidized bed and return them back to the fluidized bed via dipleg 7. Fresh solid particles can be added through the dipleg as shown by line 8 to make-up the particles that have been lost as fine particles along with the overhead gases, that leave the reactor through the product gas line 9. The cyclone may be placed within the reactor vessel or external to the vessel. Multiple cyclones may also be used for separating fine solid particles from the outgoing overhead gases and returning the separated particles back to the fluidized bed via diplegs.

The method of the invention has application for operating single bubbling fluidized bed reactor or individual bubbling fluidized bed reactors of a multiple reactor system consisting of two or more bubbling fluidized bed reactors with continuous transportation or re-circulation of solid particles between the reactors.

Bubbling fluidized bed reactor operated by said method may contain heat exchangers but it may or may not contain reactor internals. The size of the solid particles in the reactor may be below 150 um. When the reactor is operated by said method, the presence of vertical and horizontal reactor internals which are used in prior art for breaking large size gas bubbles or for restricting size of gas bubbles is not essential.

The method of present invention can be used for carrying out catalytic reactions, non-catalytic thermal reactions or non-catalytic gas-solid reactions.

When said method is used for carrying a catalytic reaction in bubbling fluidized bed reactor, the solid particles in the reactor consist essentially of a catalyst useful for catalysing the reaction. The examples of catalytic reactions which can be carried out using said method are ammoxidation of propylene or propane to acrylonitrile, oxidation of propylene or propane to acrolein and/or acrylic acid, oxidation of naphthalene or o-xylene to phthalic anhydride, oxidation of benzene or butane to maleic anhydride, Fischer Tropsch synthesis of hydrocarbons and or oxygenates from carbon monoxide and hydrogen, gas phase chlorination or oxychlorination of hydrocarbons, gas phase hydrogenation of organic compounds, fluid catalyst cracking of oil which is commonly known in FCC process fluid catalytic reforming of naphtha and other hydrocarbons, reforming of hydrocarbons to synthesis gas, hydrocracking of heavy oil, or other exothermic or endothermic catalytic reactions the operations of which are to be restricted within a narrow temperature range, either because of the explosive nature of the reaction or because of temperature sensitivity of desired product or because of product distribution considerations.

When said method is used for carrying out a non-catalytic reaction in a bubbling fluidizing bed reactor, the solid particles in the reactor consist of inert solid, such as sand, sintered silica, sintered alumina, sintered silica-alumina, sintered zirconia-haffnia or other sintered and/or refractory material which is chemically inert to the reactants of the thermal reactions, the role of which is to carry heat and provide it to the reactants of the thermal reaction. The examples of non-catalytic thermal reactions which can be carried out using said method are fluid thermal cracking processes, such as thermal cracking of naphtha and heavy oil and the like.

When said method is used for carrying out a non-catalytic gas-solid reaction in a fluidized bed reactor, the solid particles in the reactor consist essentially of solid reactant, such as reducible metal oxides, partially reduced metal oxides, deactivated catalyst due to coking of other solid reactants of known gas-solid reactions, which is converted into product of the reaction. The examples of non-catalytic gas-solid reactions are reduction of metal oxides from ores in metallurgical industries, gasification, of coal combustion of coal, regeneration of coked catalyst by gasification of carbon or coke present in the catalyst and the like.

The size of the fluidizable solid particles used in the fluidized bed reactor normally range from about 30 um to about 150 um.

In the method of this invention, the primary gas consists essentially of one or more reactants of the reaction to be carried out in the reactor and its role is to provide a minimum or incipient fluidization of solid particles in the reactor as far as possible without forming gas bubbles and thereby making the bed of solid particles fluid-like and also provide reactant (s) for the reaction in the reactor. In the method of this invention, a small number primary gas bubbles may be formed but it is preferable if no gas bubble of the primary gas is formed in the reactor.

In the method of this invention, the main role of the secondary gas is to form gas bubbles in the incipiently fluidized bed of solid particles and, thereby, to mix the solid particles in the reactor so that a uniform or isothermal temperature through out the reactor can be maintained. The other role of the secondary gas is to remove heat from or provide heat to the solid particles in the reactor. The secondary gas may also provide a reactant for the reaction(s) in the reactor.

In the method of this invention, the preferred ratio of superficial velocity of secondary gas $U_s$, to superficial velocity of primary gas $U_p$, is between 1 and 5.

In the method of this invention, the primary and secondary gases are introduced in the reactor separately, using separate gas distributors. The gas distributor used for distributing the primary gas is located at the reactor bottom and the gas distributor used for distributing the secondary gas is located above the distributor used for the primary gas. Different types of gas distributors are known in the prior art (Ref. D. Kunii and O. Levenspiel in Fluidization Engineering, John Wiley & Sons, Inc., New York, 1969).

For avoiding bypassing of the reacting gas(es) and thereby achieving an efficient gas-solid contacting in a bubbling fluidized bed by the method of this invention, it is preferable to introduce the primary gas at the bottom of the bed of the solid particles as uniformly as possible by using a suitable gas distributor known in the prior art and it is also preferable to introduce the secondary gas in form of large bubbles in the fluidized solid particles using a gas distributor consisting of single or few gas distribution nozzles or bubbles caps. Larger the size of the secondary gas bubbles, lesser is the exchange of gases between the emulsion phase and the bubble phase and hence better would be the performance of the bubbling fluidized bed reactor when operated by the method of this invention.

By using the method of this invention, highly exothermic, highly endothermic or temperature sensitive gas catalytic reaction, gas phase non-catalytic thermal reaction or non-catalytic gas-solid reaction ca be carried out in a bubbling fluidized bed reactor with high conversion and selectivity.

The invention is described with respect to the following examples illustrating the method of this invention for operating a bubbling fluidized bed reactor for carrying out catalytic or non-catalytic reactions. These examples are provided for illustrative purpose only and are not to be construed as limitations on the method of this invention.

EXAMPLES

Definition of Terms

Superficial gas velocity: It is defined as a ratio of volumetric gas flow rate to cross sectional area of the bed of solid particles. $U_p$ and $U_s$ are the superficial velocities of the primary and secondary gas, respectively.

Incipiently fluidized bed: When gas flows through solid particles present in the reactor, a pressure drop across the bed of solid particles is developed and when this pressure drop is sufficient to support the weight of the particles, the bed is said to be incipiently fluidized. In incipiently fluidized bed, all the particles in the reactor are suspended with formation of little or no gas bubbles and the bed of suspended particles behaves like a liquid.

Incipient or minimum fluidization velocity $U_m$: It is a superficial gas velocity at which solid particles in the reactor are incipiently fluidized. This velocity can be determined experimentally or estimated theoretically by the well known methods described earlier (Ref. D. Kunii and O. Levenspiel in Fluidization Engineering, John Wiley & Sons, Inc., New York, 1969).

Bubble phase: It is a discontinuous phase formed by the bubbles of fluidizing gas, which is the secondary gas, in the method of this invention.

Emulsion Phase: It is a continuous dense phase, formed by the solid particles and the fluidizing gas, which is the primary gas in the method of this invention.

All the ratios of the chemicals or gases in the examples are mole ratios.

Example 1

This example illustrates the method of this invention for operating a bubbling fluidized bed reactor for the catalytic vapor phase hydrogenation of nitrobenzene to aniline.

The catalytic reaction can be carried out in a conventional fluidized bed reactor having an inner diameter of 20 cm and height of 50 cm and containing 10 1 50±10 micron size particles of a copper catalyst (25 wt % Cu) supported on silica gel. The catalyst particles can be prepared by impregnating copper nitrate from its aqueous solution on 50±10 micron size spherical particles of silica gel followed by drying and calcining and reducing by hydrogen. The temperature in the reactor can be controlled by providing heat exchange tubes through which a heat exchange fluid is circulated. A primary gas stream, which in this case is a mixture of hydrogen and vapors of nitrobenzene with a hydrogen/nitrobenzene more ratio of 4.0 can be introduced into the reactor continuously through a gas distributor, called primary gas distributor, which is located a the bottom of the reactor, as shown in FIG. 1, at a superficial velocity equivalent to the incipient fluidization or minimum fluidization velocity $U_{mf}$, required for suspending all the catalyst particles in the reactor. The minimum fluidization of the primary gas can be obtained by increasing the superficial velocity of the primary gas and observing the increase in the pressure drop across the catalyst bed in the reactor. Initially with increase is superficial velocity, a linear increase in the pressure drop across the catalyst bed is observed until the minimum fluidization velocity is obtained. After obtaining the minimum fluidization velocity, the increase in the pressure drop with the increase in the velocity is much smaller.

Immediately after attaining the minimum fluidization velocity of the particles by the primary gas stream, a secondary gas, which in this case is pure hydrogen can be introduced in the incipient fluidized catalyst bed through a single nozzle gas distributor, called secondary gas distributor, located in the reactor immediately above the primary gas distributor as shown in FIG. 1, at a superficial gas velocity which is four times the superficial velocity of the primary gas, forming gas bubbles in the fluidized bed reactor and therefore providing a vigorous mixing of the catalyst particles in the reactor. The hydrogenation of nitrobenzene occurs in the emulsion phase according to the stoichiometric reaction:

$$C6H5NO2+3H2 \rightarrow C6H5NH2+2H2O$$

The reaction can be allowed to occur in the fluidized bed reactor at a temperature of 270±10° C. and about 2 atm. Pressure with conversion of nitrobenzene much higher than that could have been obtained when operating the bubbling fluidized reactor by introducing all the hydrogen gas along with nitrobenzene vapors through the primary gas distributor alone as in case of the conventional operation of the bubbling fluidized bed reactor.

Simple calculations show that the hydrogen/nitrobenzene mole ratio in the emulsion and bubble phase are 4.0 and ∞ when the bubbling fluidized bed reactor is operated as above by the method of this invention. Whereas, the hydrogen/nitrobenzene mole ratio in both the emulsion as well as bubble phase of the bubbling fluidized bed reactor is 24.0 when the reactor is operated by introducing all the feed gases through the primary gas distributor alone as in the case of the conventional operation of the bubbling fluidized bed reactor. When the bubbling fluidized bed reactor for the hydrogenation of nitrobenzene is operated as the method of this invention, the concentration of nitrobenzene in the hydrogen-nitrobenzene mixture in the emulsion phase is much greater (by a factor of 6.25) and hence the reaction rate and consequently the conversion nitrobenzene to aniline is expected to be much higher. Also since the limiting reactant, nitrobenzene, is mostly in the emulsion phase, and the concentration of the catalyst is much higher in the emulsion phase than that in the bubble phase, which consists essentially of hydrogen, the reacting gas-catalyst contacting is much better than that when all the feed gases are passed through the primary distributor as in case of the conventional bubbling fluidized bed reactor. Moreover, since most of the reaction can be made to occur in the emulsion phase, the problems with the scale-up and modeling of the bubbling fluidized bed reactor for accounting the by-passing of the reacting gas through the bubble phase and the exchange of gas(es) between the bubble phase and emulsion phase are eliminated, when the bubbling fluidized bed reactor is operated by the method of this invention.

Example 2

The method of this invention can be used for the vapour phase hydrogenation of ortho-nitrotoluene to ortho-toluidine, using the same reactor and procedure described in Example-1, except that nitrobenzene is replaced by ortho-nitrotoluene.

Example 3

The method of this invention can be used for the vapor phase hydrogeneration of para-nitrotoluene to para-toluidine, using the same reactor and procedure described in Example 2, except that ortho-nitrotoluene is replaced by para-nitrotoluene.

Example 4–18

The method of this invention can be used for operating a bubbling fluidized bed reactor for several other catalytic or non-catalytic chemical processes listed in Table 1, by the procedure same as that described in Example 1, except the solid particles, composition of primary gas, composition of secondary gas and operating condition of the respective processes, given in Table 1. In these examples size of the solid particles, composition of primary gas, composition of secondary gas and operating condition of the respective processes, given in Table 1. In these examples size of solid particles may range from 40 um to 120 $\mu$m and the bed length to bed diameter ratio may be between 1 and 4.

It is well known in the prior art that in case of bubbling fluidized bed reactor, gas excess of that required for the minimum fluidization forms bubbles in the fluidized bed and also that solid particles in the emulsion phase are well-mixed and the gas-flow in the reactor is a plug flow. Hence, when the bubbling fluidized bed reactor is operated by the method of this invention, as described in the above examples, there is little or no bypass of the reactants, particularly the limiting reactant through the gas bubbles and thereby very drastically improving a contact between the reacting gas and solid particles. Since the catalytic reaction occurs mainly in the emulsion phase, the scale up and the modeling of the reaction system is expected to be accomplished much more easily than that when the bubbling fluidized bed reactor is operated by the conventional method used in the prior art.

TABLE 1

Examples of the use of the method of this invention for carrying out different catalytic and non-catalytic processes in a bubbling fluidized bed reactor.

| | Example 4 | Example 5 | Example 6 |
|---|---|---|---|
| Process | Partial oxidation of methane to synthesis gas (a mixture of $H_2$ and CO) | Oxy-steam reforming of methane to synthesis gas | Oxy-$CO_2$ reforming of methane to synthesis gas |
| Solid particles | Supported Ni catalyst of 60 ± 10 $\mu$m size | Same as Example 4 | Same as Example 4 |
| Primary gas | Mixture of $CH_4$ and $O_2$ with $CH_4/O_2$ mole ratio of 1.9 | Mixture of $CH_4$, $O_2$ and steam with $CH_4:O_2:$steam = 2.0:1.0:0.4 | Mixture of $CH_4$, $O_2$ and $CO_2$ with $CH_4:O_2:CO_2$ = 2.0:1.0:0.4 |
| Secondary gas | Steam | Steam | Steam |
| Operating Conditions | | | |
| $U_p/U_{mf}$ ratio | 1.0 | 1.0 | 1.0 |
| $U_s/U_p$ ratio | 4.0 | 1.0 | 2.0 |
| Temperature (° C.) | 800–900 | 800–900 | 800–900 |
| Pressure (atm) | >1.0 | >1.0 | >1.0 |
| Gas in the emulsion phase | Mixture of mainly $CH_4$ and $O_2$ | Mixture of mainly $CH_4$ and $O_2$ and steam | Mixture of mainly $CH_4$ and $O_2$ and $CO_2$ |
| Main reactions in the emulsion phase | $CH_4 + 0.5 O_2 \rightarrow CO + H_2$ | $CH_4 + 0.5 O_2 \rightarrow CO + H_2$ $CH_4 + H_2O \leftrightarrows CO + 3H_2$ $CO + H_2O \leftrightarrows CO_2 + H_2$ | $CH_4 + 0.5 O_2 \rightarrow CO + H_2$ $CH_4 + CO_2 \rightarrow 2CO + 2H_2$ $CO_2 + H_2 \leftrightarrows CO + H_2O$ |
| Gas in the bubble phase | Mainly steam | Mainly steam | Mainly steam |

| | Example 7 | Example 8 | Example 9 |
|---|---|---|---|
| Process | Oxy-$CO_2$-steam reforming of methane to synthesis gas | Ammoxidation of propylene to acrylonitrile | Ammoxidation of propylene to acrylonitrile |
| Solid particles | Same as Example 4 | Commerical propylene ammoxidation catalyst | Same as that in Example 8 |
| Primary gas | Mixture of $CH_4$, $O_2$ and $CO_2$ and steam with $CH_4:O_2:CO_2:$steam = | Mixture of $C_3H_6$, $NH_3$ and $O_2$ with $C_3H_6:NH_3:O_2$ mole ratio = | Mixture of $C_3H_6$, $NH_3$ and air with $C_3H_6:NH_3:$air mole ratio = |

TABLE 1-continued

Examples of the use of the method of this invention for carrying out different catalytic and non-catalytic processes in a bubbling fluidized bed reactor.

| | | | |
|---|---|---|---|
| | 2.0:1.0:0.2:0.2 | 1.0:1.0:1.5 | 1.0:1.0:1.0 |
| Secondary gas Operating Conditions | Steam | Air | Steam |
| $U_p/U_{mf}$ ratio | 1.0 | 1.0 | 1.0 |
| $U_s/U_p$ ratio | 2.0 | 3.0–5.0 | 2.0 |
| Temperature (° C.) | 800–900 | 400–500 | 400–500 |
| Pressure (atm) | >1.0 | 2.0 | 2.0 |
| Gas in the emulsion phase | Mixture of mainly $CH_4$ and $O_2$, $CO_2$ and steam | Mixture of mainly $C_3H_6$, $NH_3$ and $O_2$ | Mixture of mainly $C_3H_6$, $NH_3$ and air |
| Main reactions in the emulsion phase | $CH_4 + 0.5\ O_2 \rightarrow CO + 2H_2$<br>$CH_4 + CO_2 \rightarrow 2CO + 2H_2$<br>$CH_4 + H_2O \rightarrow CO + 3H_2$ | $C_3H_6 + 1.5\ O_2 \rightarrow CH_2=CHCN + 3H_2O$ | Same as in Example 8 |
| Gas in the bubble phase | Mainly steam | Mainly air | Mainly steam |

| | Example 10 | Example 11 | Example 12 |
|---|---|---|---|
| Process | Ammoxidation of propylene to acrylonitrile | Ammoxidation of propylene to acrylonitrile | Oxidation of propylene to acrolein |
| Solid particles | Same as that in Example 8 | Same as that in Example 8 | Bismuth molybdate containing catalyst |
| Primary gas | Same as that in Example 8 | Same as that in Example 9 | Mixture of $C_3H_6$ and air with $C_3H_6$:air mole ratio = 1.0:6.0 |
| Secondary gas Operating Conditions | Mixture of steam and air with steam:air mole ratio = 1:1 | Same as that in Example 10 | Steam |
| $U_p/U_{mf}$ ratio | 1.0 | 1.0 | 1.0 |
| $U_s/U_p$ ratio | 5.0 | 5.0 | 3.0 |
| Temperature (° C.) | 400–500 | 400–500 | 350 |
| Pressure (atm) | 2.0 | 2.0 | 2.0 |
| Gas in the emulsion phase | Same as that in Example 8 | Same as that in Example 9 | Mixture of mainly $C_3H_6$ and air |
| Main reactions in the emulsion phase | Same as that in Example 8 | Same as that in Example 8 | $C_3H_6 + O_2 \rightarrow CH_2=CHCHO + H_2O$ |
| Gas in the bubble phase | Mainly a mixture of steam and air | Same as that in Example 10 | Mainly steam |

| | Example 13 | Example 14 | Example 15 |
|---|---|---|---|
| Process | Oxidation of acrolein to acrylic acid | Regeneration of coked FCC catalyst | Regeneration of coked FCC catalyst |
| Solid particles | Mixed Co—Mo—Mn oxides catalyst | Coked FCC catalyst | Coked FCC catalyst |
| Primary gas | Mixture of acrolein and air with acrolein:air mole ratio = 1.3 | Mixture of air and steam with air:steam mole ratio of 1:2 | Same as that in Example 14 |
| Secondary gas Operating Conditions | Steam | Steam | Air |
| $U_p/U_{mf}$ ratio | 1.0 | 1.1 | 1.0 |
| $U_s/U_p$ ratio | 3.0 | 2.0 | 4.0 |
| Temperature (° C.) | 290 | 500–600 | 500–600 |
| Pressure (atm) | 3.0 | 1–2 | 1–2 |
| Gas in the emulsion phase | Mixture of acrolein and air | Mainly mixture of air and steam | Mainly mixture of air and steam |
| Main reactions in the emulsion phase | $CH_2=CHCHO + 0.5\ O_2 \rightarrow CH_2=CHCOOH + H_2O$<br>$\Delta H = -254\ kJ.mol^{-1}$ | Coke + $O_2 \rightarrow CO_2$ and water | Same as that in Example 14 |
| Gas in the bubble phase | Mainly steam | Mainly steam | Mainly air |

| | Example 16 | Example 17 | Example 18 |
|---|---|---|---|
| Process | Oxychlorination of ethane | Fischer Tropsch synthesis | Hydrocracking of oil |
| Solid particles | $Cu^{2+}$-exchanged NaY zeolite (US 3987118) | Pottasium promoted iron catalyst | Pd/ultra stable Y zeolite |
| Primary gas | Mixture of ethane, oxygen and HCl | Mixture of CO and $H_2$ with CO:$H_2$ mole ratio of 1:1.5 | Mixture of heavy oil and $H_2$ |
| Secondary gas Operating Conditions | Air | Steam | Hydrogen |
| $U_p/U_{mf}$ ratio | 1.0 | 1.0 | 1.0 |
| $U_s/U_p$ ratio | 3.0 | 1.0 | 1.5 |
| Temperature (° C.) | 300–450 | 320 | 300–400 |
| Pressure (atm) | 1–2 | 15–20 | 10 |
| Gas in the emulsion phase | Mixture of ethane, oxygen and HCl | Mixture of CO and $H_2$ | Mixture of oil and $H_2$ |
| Main reactions in the emulsion phase | $C_2H_6 + HCl + O_2 \rightarrow$ Chlorinated ethane such as 1,2 dichloroethane, 1,2,dichloroethylene, 1,2, dichloroethane, trichloroethylene, perchloroethylene and vinyl chloride | $CO + H_2 \rightarrow$ liquid hydrocarbons | Oil + $H_2 \rightarrow$ lighter hydrocarbons |
| Gas in the bubble phase | Air | steam | Hydrogen |

The Main Novel Features and Advantages of the Method of Present Invention Over the Prior Art Method of Operating Bubbling Fluidized Reactors are as Follows:

1. In the prior art method for the operation of bubbling fluidized bed reactor for gas phase catalytic or non-catalytic reactions, both the emulsion and bubble phases in the reactor are formed by a gaseous fed comprising of reacting gas(es) and hence thee is serious problem of bypass of a large part of reacting gas(es), without its contacting with solid particles present in the reactor, through the gas bubbles. Whereas in the method of present invention, emulsion phase or incipiently fluidized bed of solid particles is formed by reacting gas(es), called primary gas, and gas bubbled are formed by a gas other than the primary gas and hence there is no direct bypass of reacting gas through gas bubbles; only a small part of reacting gas(es), which is transferred from emulsion phase to bubble phase during the formation and rise of bubbles is bypassed.
2. In case of the prior art method, there is a poor or inefficient contacting between reacting gas(es) and solid particles in a bubbling fluidized bed reactor and hence it is possible to achieve high conversions of reacting gas(es) for a given operating superficial gas velocity only when the bed length to bed diameter ratio in the reactor is high, thus requiring larger volume of solid particles, larger reactor and consequently higher capital cost and also larger pumping cost due to the increased pressure drop across the bed. On the contrary incase of the method of present invention, most of the reacting gas(es) is present in emulsion phase and hence there is an efficient contacting between reacting gas(es) and solid particles in bubbling fluidized bed reactor, and thereby, it is possible to achieve high conversion of reaching gas(es) in catalytic or non-catalytic reactions even in a shallow bubbling fluidized bed reactor having a low bed length to bed diameter ratio.

3. In case of the prior art method, the flow pattern of reacting gas(es) in the bubbling fluidized bed reactor is complex, not well known, and also with considerable bypassing, as the reaching gas flows through both the emulsion and bubbles phases with some exchange of gas between the two phases and, therefore the flow pattern which will develop, the degree of contacting between reacting gas (es) and solid particle and the conversion of reacting gas(es) in the reactor performance can not be predicted with assurance. Because of this, the design and scale-up of bubbling fluidized bed reactor are difficult and also unreliable. Whereas when the reactor is operated by the method of present invention, the contacting between reacting gas(es) and solid particles is efficient and the flow pattern, particularly of reacting gas(es), in the reactor can be predicted with assurance. All these simplify the design or scale up of the reactor and also make it reliable.

4. In case the prior art method, internals in the reactor are essential for breaking large size bubbles, and thereby, avoiding some bypass of reacting gas. Whereas in case of the method of this invention, thee is no need to break large size bubbles and hence reactor internals are not essential and this reduces the capital cost and other complications created by reactor internals.

We claim:

1. A method for ammoxidation of propylene or propane to acrylonitrile, comprising a step requiring gas-solid contact in a bubbling fluidized bed reactor said method comprising:

(a) introducing into a reactor with bed length to bed diameter ratio below about 5.0, a primary gas consisting essentially of reactant(s) of the reaction to be carried out in the bed of solid particles through a primary gas distributor located at the reactor bottom at a superficial gas velocity $U_p$, which is very close or equivalent to the minimum fluidization velocity $U_{mf}$, required for achieving the incipient fluidization of the solid particles in the bed to obtain an emulsion phase consisting essentially of the solid particles and the primary gas with little or no formation of gas bubbles to achieve incipient fluidization or liquid-like behavior of fluidizable solid particles;

(b) forming gas bubbles in the incipiently fluidized bed by introducing through a secondary gas distributor located immediately above the primary gas distributor a secondary gas, selected from one of the reactants which is used in excess of that required for the reaction stoichiometry, steam, an inert or a mixture of two or more thereof at a superficial gas velocity, $U_s$, which is related to the superficial velocity of the primary gas such that a ratio of the superficial velocity of the secondary gas to the superficial velocity of the primary gas $U_s/U_p$, is in the range from about 0.5 to about 10.0.

2. A method as claimed in claim 1 wherein the direct bypassing of the reacting gas through gas bubbles is avoided using a reacting gas only for obtaining an incipient fluidization without forming gas bubbles, while retaining the advantages of bubbling fluidized bed reactor.

3. A method as claimed in claim 1 wherein the reactor comprises a single bubbling fluidized bed reactor or individual bubbling fluidized bed reactors of a multiple reactor system consisting of two or more bubbling fluidized bed reactors with continuous transportation or re-circulation of solid particles between the reactors.

4. A method as claimed in claim 1 wherein the size of the solid particles in the reactor is below 150 um.

5. A method as claimed in claim 1 wherein the reaction comprises a catalytic reaction, a non-catalytic thermal reaction or a non-catalytic gas-solid reaction.

6. A method as claimed in claim 5 wherein the solid particles in the reactor consist essentially of a catalyst useful for catalyzing the reaction.

7. A method as claimed in claim 1 wherein when said method is used for carrying out a non-catalytic gas-solid reaction in a fluidized bed reactor, the solid particles in the reactor consist essentially of solid reactant, such as reducible metal oxides, partially reduced metal oxides, deactivated catalyst due to coking of other solid reactants of known gas-solid reactions, which is converted into product of the reaction.

8. A method as claimed in claim 7 wherein the non-catalytic gas-solid reactions are selected from reduction of metal oxides from ores in metallurgical industries, gasification, of coal combustion of coal or regeneration of coked catalyst by gasification of carbon or coke present in the catalyst.

9. A method as claimed in claim 1 wherein the size of the fluidizable solid particles used in the fluidized bed reactor are in the range of from 30 pm to 150 gm.

10. A method as claimed in claim 1 wherein the primary gas comprises of one or more reactants of the reaction to be carried out in the reactor.

11. A method as claimed in claim 1 wherein the ratio of superficial velocity of secondary $U_s$, to superficial velocity of primary gas $U_p$, is between 1 and 5.

12. A method as claimed in claim 1 wherein the primary and secondary gases are introduced in the reactor separately, using separate gas distributors.

* * * * *